United States Patent Office 3,427,266
Patented Feb. 11, 1969

3,427,266
WATER-DISPERSIBLE EPOXY-MODIFIED ALKYD RESIN AND PROCESS THEREFOR
Gordon Phillips, Parkview, and Tony R. Casshie, Cleveland, Ohio, assignors, by mesne assignments, to SCM Corporation, New York, N.Y., a corporation of New York
No Drawing. Filed Apr. 23, 1965, Ser. No. 450,541
U.S. Cl. 260—22                                           6 Claims
Int. Cl. C08g 30/04

ABSTRACT OF THE DISCLOSURE

Water dispersible epoxy-modified alkyd resins which may be employed in aqueous media to produce stable film forming compositions which produce air dryable water insoluble alkali and acid resistant, durable films when applied to surfaces are obtained by,
(1) reacting a glycidyl polyether of a dihydric phenol and a monocarboxylic fatty acid to form a partial ester of said polyether and said monocarboxylic fatty acid;
(2) reacting said partial ester with a polycarboxylic acid, a polyhydric alcohol, and a hydroxyl substituted aliphatic acid to form a hydroxyl substituted acid-containing reaction product;
(3) reacting said hydroxyl substituted acid-containing reaction product with an alkaline compound having a low vapor pressure to form a partially neutralized product; and
(4) reacting the partially neutralized product with ammonia.

---

The present invention relates to an improved alkyd resin and to a process for preparing such resin. The invention also relates to a dispersion of an improved epoxy modified alkyd resin which may be employed in aqueous media to produce stable film forming compositions which produce air dryable water insoluble alkali and acid resistant, durable films when applied to surfaces.

U.S. Patent 2,887,459, issued May 19, 1959, to Raymond F. Carmody, discloses alkyd resins which are condensation products of one or more drying oils or drying oil fatty acids, phthalic anhydride, a polyhydric alcohol such as glycerine or pentaerythritol and an epoxide resin derived from 4,4′-dihydroxy-diphenyl-2,2-propane.

U.S. Patent 3,027,341, issued Mar. 27, 1962, to John Balding Boucher et al., describes an alkyd resin prepared by adding a poly basic acid (e.g., phthalic acid) and a polyhydric alcohol (e.g., trimethylolethane) to a partially reacted mixture of an epoxide resin and an unsaturated monocarboxylic fatty acid of a glyceride oil. This patent further discloses that the above product is reacted with an aliphatic amine (e.g., trimethylamine).

U.S. Patent 3,040,000, issued June 19, 1962, to James R. Stevens, et al., discloses a polyester resin obtained by reacting a glycol (e.g., diethylene or triethylene glycol) with trimellitic anhydride and allyl alcohol. This material according to the teaching of this patent is then reacted with ammonia or an aliphatic amine (e.g., 2-amino-2-methyl-1-propanol) to convert it to a water soluble resin.

The Trojan Powder Company's Technical Bulletin entitled "Trojan DMPA" Bulletin No. 2 (DMPA is Trojan Powder Company's Trademark for Dimethylol Propionic Acid, e.g., 2,2 bis(hydroxymethyl) propionic acid) issued Sept. 2, 1963 describes alkyd resins containing phthalic anhydride, fatty acids of glyceride oils (e.g., linseed, soya and tall oil fatty acids) pentaerythritol, trimethylol ethane and dimethylol propionic acid.

The novel resins of the present invention comprise reaction products which contain an epoxide and certain hereinafter defined hydroxyl substituted aliphatic acids. These novel resins possess a number of unexpectedly advantageous properties over the resins described in the aforementioned U.S. Patents and the Technical Bulletin of the Trojan Powder Company. The novel resins are generally more stable, that is, they do not decompose or hydrolize when dispersed in liquid media, such as organic solvents or mixtures of organic solvents and water which is generally typical of the resins described in the prior art. Such stability is important in that the novel resins may be incorporated in liquid media to provide stable paint and varnish formulations which do not alter their properties when in formulations which are stored under conditions of commerce. Also film forming and/or coating compositions containing the epoxy modified hydroxyl substituted aliphatic acid resinous products of the present invention provide films and coatings which are superior with respect to water, acid and alkali resistance and durability to the coatings prepared from resins described in the above mentioned publications.

The present invention provides an epoxy modified alkyd resin comprising the reaction product obtained by reacting (a) a glycidyl polyether of a dihydric phenol and (b) a monocarboxylic fatty acid of a glyceride oil thereby forming a reaction mixture comprising a partial ester of the polyether and a monocarboxylic fatty acid. The reaction mixture is then reacted with (c) a polycarboxylic acid (d) a polyhydric alcohol and a hydroxyl substituted aliphatic acid of the formula

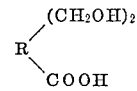

where R is an alkylene group of from 1 to 4 carbon atoms.

Other compounds which may be employed in the processes to form the improved resins of the present invention include, for example, glyoxylic acid, glyceric acid, and mixtures thereof. Of the hydroxyl substituted aliphatic acids falling within the class of compounds embraced by the above formula dimethylol propionic acid is preferred. Resins comprising the above described reaction products are viscous liquids or semisolids and are usually soluble or dispersible in organic liquids but are water insoluble.

In another aspect of this invention the above described resins may be converted from a material which is soluble or dispersible in organic liquids to a novel resin which is dispersible in aqueous media. This conversion is accomplished by reacting the aforedescribed improved resin with an amount, sufficient to partially neutralize the resin, of an alkaline material such as an alkali metal hydroxide or an aliphatic amine and thereafter completely neutralizing the resin with ammonia. As will be hereinafter evident the two-step neutralization, e.g. the partial neutralization followed by ammonia, is critical in the formation of water dispersible resins which are stable when incorporated in coating compositions and in the formation of durable resistant films.

The above described resins, prior to neutralization, when incorporated in organic liquids form tough, adhesive, hydrophobic films or coatings when applied to surfaces. Resin compositions containing one or more of the above described alkaline compounds and ammonia are water dispersible, that is they form clear, compatible, permanent mixtures in aqueous media that can be called "solutions" or "apparent" solutions. When incorporated in aqueous media such as water based paint formulations these alkaline resins form air dryable, tough, adhesive, hydrophobic films and coatings when applied to surfaces.

Water base formulations containing the water dispersible resins of this invention are generally more economical and safer to use than solvent based formulations.

Alkyd or polyester resins are conventionally prepared by reacting a polycarboxylic acid or an anhydride thereof with a polyhydric alcohol. The preparation of these resins may simply comprise the admixture of the acid and the alcohol at elevated temperatures whereby the alcohol and the acid react, with the formation of water which is removed during the reaction, to form an alkyd resin. At the beginning of the reaction the acid value of the product is relatively high (e.g. above 120). As the reaction is continued the acid value usually falls until the reaction is terminated when the acid value is at the selected specification of the resin.

Modified alkyd resins having an acid value of between 20 and 100 have been prepared as described in the aforementioned U.S. patents by reacting a polycarboxylic acid or an anhydride thereof, a polyhydric alcohol and in addition an epoxide resin (sometimes herein referred to as a glycidyl polyether of a dihydric phenol) and a fatty acid. These resins usually have an initially high acid value during the early stages of the reaction which falls as the reaction proceeds until the finished resin has a lower acid value. These resins are known in the art as epoxy modified or epoxy-oil modified alkyd resins. They generally form tougher and more water and alkali resistant coatings, when incorporated in coating compositions, than the unmodified alkyd or polyester resins.

The preparation of the epoxy modified alkyd resin of the present invention is generally conventional and is usually carried out in two basic steps. The first step comprises mixing a hereinafter defined epoxy resin with a monocarboxylic fatty acid of a glyceride oil until the mixture is partially reacted (e.g., partially esterified) and the functionality of the epoxy resin is substantially reduced. The alkyd resin components (e.g., the polycarboxylic acid and the polyhydric alcohol) are then added in any order and the resultant product heated until the desired acid value is obtained. In the resins of the present invention in which a hydroxyl substituted aliphatic acid is substituted for a portion of the polyhydric alcohol the acid value is preferably in the range of about from 20 to about 90, more preferably about 30 to about 50, and the reaction is continued until the resin product having an acid value within this range is obtained.

The alkyd resin components which have been found advantageous for use in the products of the present invention are, with the exception of the above mentioned hydroxyl aliphatic acid, conventional polyester resin components of resins prepared as above described. Any of a number of suitable well-known polycarboxylic acids may be employed such as for example phthalic acid, isophthalic acid, phthalic anhydride, sebacic acid, azeleic acid, adipic acid, succinic acid, maleic acid or the like. However, in view of the intended end use of the resin in film forming and coating compositions, phthalic acid or phthalic anhydride is preferred.

A variety of polyhydric alcohols may be employed including, for example, glycerine, ethylene glycol, propylene glycol, trimethylolpropane, e.g., 2,2 bis (hydroxy methyl) butanol-1 and trimethylolethane, e.g., 2,2 bis (hydroxy methyl) propanol 1. Of these polyhydric alcohols trimethylolethane is preferred.

The epoxy resins which can be employed in forming the epoxy modified alkyd resins of the present invention are based on ethylene oxide, its homologs or derivatives. The repeating unit of the resin has been postulated to have the formula

Such compounds are usually prepared by the condensation of a poly functional halohydrin or glyceroldichlorohydrin and polyhydric compounds, particularly dihydric phenols such as, for example, bisphenol A. The epoxide equivalent of these epoxy resins is preferably in the range of from 140 to 2,000. Commercially available epoxy resins (epichlorohydrin bisphenol resins which are suitable for use in the present invention) include the "Epon" resins; the "Araldite" resins, and the "Epi-Rez" resins. Specific resins including the Epon resins known as 834, 1001 and 1004 have been found to be particularly useful.

The monocarboxylic fatty acid may be employed as such or may be reacted or incorporated as a natural oil. Such oils and monocarboxylic fatty acids include linseed fatty acids, soya fatty acids, coconut fatty acids, safflower fatty acids, conjugated linseed fatty acid, pelargonic fatty acid, tung oil, linseed oil, caster oil fatty acids, dehydrated castor oil fatty acids, tall oil fatty acids, linoleic acids and the like. Mixtures of any of these oils or fatty acids may be suitably employed. Preferred mixtures of monocarboxylic fatty acids include a mixture of tall oil fatty acids and safflower fatty acids or oils since more durable films are obtained from resins containing mixtures of these oils. Particularly preferred is a mixture containing from about 50% to about 85% of tall oil fatty acids, the balance of the mixture consisting of safflower fatty acids.

One embodiment of this invention comprises an epoxy modified alkyd resin having an acid number of between 20 and 90 comprising the reaction product obtained by reacting (a) from about 1% to about 25% by weight based on the weight of reaction product of a glycidyl polyether of a dihydric phenol and (b) from about 5% to about 60% by weight based on the weight of the reaction product of a monocarboxylic fatty acid, preferably a mixture comprising a major amount of tall fatty acids and a minor amount of safflower fatty acids. By so proceeding a reaction mixture comprising a partial ester of the polyether and the fatty acid is formed. This reaction mixture is then further reacted with (c) from about 50% to about 10% by weight based on the weight of the reaction product of a polycarboxylic acid, preferably phthalic anhydride and (d) from about 0.5 to about 1.5 mols per mol of the polycarboxylic acid of a polyhydric alcohol, preferably trimethylolethane. By so proceeding an epoxy-modified alkyd resin is obtained which, in accordance with this invention, is improved by the substitution of from about 30% to 70% of the polyhydric alcohol with an hydroxy substituted aliphatic acid preferably dimethylol propionic acid since resin reaction products containing this compound provide rosin dispersions which have exceptional stability. By so proceeding a resin dispersible in organic solvents is formed.

In another embodiment of this invention the above resin can be converted to a water dispersable form by reacting the resin first with from about 1.0 to about 2.0 parts per 100 parts of the resin of an alkaline compound having a low vapor pressure, such as an alkali metal hydroxide or an aliphatic amine, preferably an alkali metal hydroxide, more preferably potassium hydroxide, to form a partially neutralized reaction product. The partially neutralized reaction product is then reacted with from about 0.6 to about 0.8 part of ammonia per 100 parts of the reaction product provide a stable water dispersible resin.

The order of addition of the alkaline compound having a low vapor pressure and of the ammonia which has a high vapor pressure is critical. If the ammonia is omitted or added prior to the alkaline compound the resin formed will not form acid and alkali resistant films when incorporated in film forming compositions. If the alkali metal hydroxide or aliphatic amine is used to the exclusion of ammonia, the same result obtains. If ammonia alone is used for both neutralization steps, increased yellowing of the coating results.

The epoxy modified alkyd resins of this invention can be prepared by admixing, with agitation, any of the hereinbefore defined epoxy resins with one or more monocarboxylic fatty acids or glyceride oils thereof, and partially reacting the mixture by means of heat, usually at a temperature in the range from about 165° C. to about 200° C. to form the reaction mixture hereinbefore defined. This temperature should be maintained until the epoxy resin has been at least partially defunctionalized, that is, until the acid value of the reaction mixture has dropped to between about 90 to about 120 and a reaction mixture comprising a partial ester of the polyether and fatty acid is formed. (As will be evident to those skilled in the art, residual functionality is directly related to the acid value of the reaction product.) Consequently measurement of the acid value is an indication that the reaction has proceeded to the desired extent. Thereafter the polycarboxylic acid, polyhydric alcohol and saturated polyhydroxy substituted lower aliphatic monocarboxylic acid are added to the reaction mixture with agitation and reacted at a temperature in the range from about 220° C. to about 240° C. to form the improved epoxy modified alkyd resin.

The amount of glycidyl polyether of a dihydric phenol employed can vary within the range from about 1% to about 25% by weight, based on the weight of the final composition. If less than about 1% of the glycidyl polyether is employed the final product will lose a significant amount of its film forming properties and tend to form coatings which are not as resistant to environmental attack or mechanical abrasion. On the other hand if more than about 25% by weight of the polyether is employed, excessive amouts of fatty acids may be required in order to adequately defunctionalize the polyether and the resin obtained will tend to be extremely viscous or solid and will be difficulty dispersible in liquids.

The amount of monocarboxylic fatty acid or glyceride oil thereof employed will depend to some extent upon the amount of polyether used since a partial ester of the ether and the acid is desired. Generaly from about 5% to about 60% by weight, based on the weight of the final resin composition, of the fatty acid will produce advantageous resin products. The lower concentration of fatty acid will, in general correspond to the lower concentration of glycidyl polyether. If less than about 5% by weight of the fatty acid is employed the functionality of the polyether will not be sufficiently reduced and high molecular weight resins which are usually not dispersible in organic liquids or water will be obtained. If more than about 60% by weight of the fatty acid is employed it is virtually impossible to form a partial ester with the polyether and the final product will comprise a mixture of an epoxide (e.g. a polyether ester) resin and an alkyd resin rather than an epoxy modified alkyd resin.

The balance of the resin composition will generally comprise the alkyd or polyester moiety (e.g. polycarboxylic acid, polyhydric alcohol and hydroxy substituted monocarboxylic acid). This moiety, however, reacts with the partial ester of the glycidyl polyether and the fatty acid during the formation of the epoxy modified resin. It has been found advantageous to add to the partial ester of polyether and fatty acid from about 10% to about 40% by weight, based on the weight of the final resin product of a polycarboxylic acid, and a slight excess over the stoichiometric amount of a mixture of the polyhydric alcohol and the hydroxy substituted lower aliphatic monocarboxylic acid having at least two hydroxyl groups. Such mixture should be present in an amount sufficient to provide at least one hydroxyl group for each carboxylic acid group in the polycarboxylic acid molecule. In practice a mixture of polyhydric alcohol and hydroxy substituted aliphatic acid are usually employed in an amount exceeding at least about 5% of the proportion theoretically required for complete esterification of the carboxylic acid.

The mixture of polyhydric alcohol and hydroxy substituted aliphatic acid may vary widely as to the alcoholacid content. However, the hydroxy substituted acid may be present in an amount from about 0.2 mol to about 0.8 mol per mol of polycarboxylic acid in the final resin product and the balance of the alcohol acid mixture will consist of an amount of polyhydric alcohol sufficient to provide a total stoichiometric quantity of hydroxyl groups. If less than about 0.2 mol of hydroxy substituted monocarboxylic acid is employed per mol of carboxylic acid the resin obtained will not have the desired stability or film forming properties which are present when 0.2 or more mols of acid is present in the composition. If more than about 0.8 mol of hydroxy substituted acid per mol of carboxylic acid is used the acid value of the resin will be unduly high and coatings made from the resin will tend to become unstable when dispersed in liquids (e.g., solvent and solvent-water mixtures).

As noted hereinbefore the above resins may be further treated and converted to a resin which is water dispersible. When so converted the resin is suitable for incorporation in water based film forming and coating compositions such as paints. The conversion of the foregoing epoxy modified alkyl resin which is usually dispersible only in organic solvents can be suitably accomplished by first reacting at a temperature in the range of from about 10° C. to about 100° C. An alkali metal hydroxide or aliphatic amine with the aforementioned resin to partially neutralize the resin. Thereafter the partially neutralized product is reacted with ammonia until the resin is neutralized and usually contains an excess of alkaline materials.

Examples of alkali metal hydroxides which are suitable for the partial neutralization of the alkyd resin include hydroxides of metals of Group 1–a of the Periodic Table. Of these potassium hydroxide has been found to be particularly advantageous.

Aliphatic amines which can be suitably employed include primary, secondary and tertiary aliphatic amines and their derivatives which are soluble in water to the extent of at least 1% by weight. Examples of such amines include triethylamine, dimethyl aminomethanol, diethanolamine, diethylenetriamine and triethanolamine. Examples of aliphatic diamines include ethylene diamine, propylene diamine; cyclic amines including morpholine, substituted morpholine and piperidine may also be employed. When the initial epoxy modified alkyd resin is reacted to convert it to a water dispersible resin, the alkaline materials may be admixed directly with the resin. Generally from about 1.0 to about 2.0 parts of alkaline compound, having a low vapor pressure (e.g., either an alkali metal hydroxide or aliphatic amine) per 100 parts of resin is added with agitation, to the mixture to obtain partial neutralization and thereafter from about 0.6 to about 0.8 parts of ammonia per 100 parts of the partially neutralized resin, is added with agitation to completely neutralize the material.

It has been found desirable, however, to disperse the epoxy modified alkyd resin in a water soluble organic solvent prior to neutralization and thereafter to add to the resin-solvent dispersion the alkali metal hydroxide or aliphatic amine in the form of an aqueous solution. By so proceeding it is possible, due to the presence of water, to determine the pH of the dispersion and to get a more accurate determination as to when the resin has undergone sufficient partial neutralization. It has been also found desirable to add the aqueous solution of the alkaline material (having a low vapor pressure) at a concentration of 15% to 25% by weight, and to add this material to the dispersion in an amount sufficient to provide a pH of between about 6 and about 7 in the aqueous dispersion. The ammonia may then be added to the dispersion to complete the neutralization either in gaseous form or in the form of an aqueous solution in an amount sufficient to raise the pH of the dispersion to between about 7.5 and 8.5. It has been found preferable, however, to add the ammonia to the dispersion in the form of an aqueous solution containing between about 25% to about 30% by weight of $NH_4OH$.

The organic solvent in which the resin is dispersed is preferably a water soluble lower alkoxy lower alkanol, wherein the alkoxy group contains from 1 to 3 carbon atoms and the alkanol group contains from 1 to 4 carbon atoms. A wide variety of water soluble lower alkoxy lower alkanols may be employed including, for example, methoxy ethanol, ethoxy ethanol, isopropoxy ethanol, butoxy ethanol, methoxy propanol, 3-methoxy butanol and n-propoxy propanol. The above solvents are lower alkoxy alkanols which are generally soluble in water and the neutralized resin dispersion may then be dispersed directly in water to form an aqueous medium suitable for use as a film forming or coating composition. Of the foregoing lower alkoxy alkanols n-propoxy propanol is particularly preferred. Preferred organic solvents are described in U.S. patent application Ser. No. 450,530 filed simultaneously with the present application and assigned to the same assignee as the assignee of the present application.

The amount of resin which may be dispersed or dissolved in the lower alkoxy lower alkanol may vary considerably within the ranges of from about 30% by weight to about 70% by weight of resin in the solvent. It has been found both advantageous and preferable to disperse or dissolve the maximum amount of resin in the solvent. Preferred resin concentrations are therefore from between about 50% to about 70% by weight, based on the weight of the dispersion.

A particularly advantageous embodiment of the resin dispersion of this invention is obtained by reacting from about 1% to about 25% by weight, based on the weight of the resinous reaction product, of a glycidyl polyether of a dihydric phenol and from about 5% to about 60% by weight, based on the weight of the resinous reaction product, of a monocarboxylic fatty acid, preferably a mixture of tall oil and safflower oil fatty acids to form a reaction mixture comprising a partial ester of the polyether and the fatty acids. The reaction mixture is then reacted with from about 50% to about 10% by weight, based on the weight of the reaction product, of a polycarboxylic acid, preferably phthalic anhydride, from about 0.5 to about 1.0 mol per mol of polycarboxylic acid of a polyhydric alcohol, preferably trimethylolethane and from about 1.0 to about 0.5 mol per mol of the carboxylic acid of a hydroxyl substituted aliphatic acid of the formula

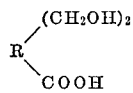

where R is an alkylene group of from 1 to 4 carbon atoms. By so proceeding there is formed an improved epoxy modified alkyd resin comprising a hydroxyl substituted, fatty acid containing, reaction product. This resinous reaction product is then reacted with from about 1.0 to about 2.0 parts of an alkaline compound having a low vapor pressure per 100 parts of the reaction product. Such an alkaline compound can be either an alkali metal hydroxide or an aliphatic amine and is preferably an alkali metal hydroxide, more preferably potassium hydroxide, to form a partially neutralized product. The partially neutralized product is then further reacted with from about 0.6 to about 0.8 parts of ammonia per 100 parts of product.

In a particularly preferred embodiment of a process of this invention the hydroxyl substituted aliphatic acid containing the alkyd resin reaction product is first dispersed in a lower alkoxy lower alkanol (hereinbefore described) to form a dispersion comprising from between about 30% to about 70% by weight of resin in the alkoxy-alkanol. To the dispersion there is added with agitation and in an amount sufficient to provide a pH in the dispersion of between about 6 and 7 an aqueous solution containing from about 15% to about 25% by weight of potassium hydroxide thereby forming a partially neutralized alkyd resin dispersed in the alkanol. To this partially neutralized dispersion there is added in an amount sufficient to raise the pH of the dispersion to between about 7.5 and about 8.5 an aqueous solution containing from about 25% to about 35% by weight of $NH_4OH$. By so proceeding there is formed a substantially neutral resin dispersed in a lower alkoxy lower alkanol and this resin dispersion may then be directly further dispersed in water to provide clear, transparent, aqueous-organic solvent media suitable for use in the formulation of water based film forming and coating compositions such as paints.

The following specific examples are intended to illustrate the invention but not to limit the scope thereof, parts and percentages being by weight unless otherwise specified.

Example 1

The following improved epoxy modified resin containing ingredients in the amounts listed below was prepared as hereinbefore described:

| Ingredient | Weight in grams |
|---|---|
| Epoxy resin | 160 |
| Tall oil fatty acids | 525 |
| Trimethylolethane | 150 |
| Dimethylol propionic acid | 250 |
| Phthalic anhydride | 400 |

The above resin, having an epoxide equivalent of from about 870–1025, and the tall oil fatty acids were charged into a 3-necked flask equipped with an agitator, thermometer, an inert gas inlet and outlet and a heating mantle. The mixture was heated in an atmosphere of carbon dioxide at substantially atmospheric pressure to 200° C. and held at the temperature until the acid value had dropped to 85. The trimethylolethane and the dimethylol propionic acid were then added simultaneously to the flask during which time the temperature of the reaction mixture in the flask dropped to 175° C. Heating was continued for about 30 minutes during which time the temperature of the reaction mixture was raised to 200° C. at which time the phthalic anhydride was added. The heating was then continued until the temperature of the reaction mixture reached 220° C. and this temperature was maintained until a reaction product having an acid value of 56 was obtained. The resin was then removed from the flask and cooled to 90° C.

Example 2

To 1,000 grams of the resin prepared in Example 1 there was added with agitation 100 grams of dimethyl amino ethanol while the resin was maintained at a temperature of 90° C. Thereafter gaseous ammonia was sparged into the liquid resin until 6 grams of ammonia had been reacted.

The above resin can be dispersed in aqueous media containing solvents to provide a clear, transparent, water dispersion which remained clear on storage for several months. By way of contrast an epoxy modified resin similar to that prepared in Example 1, except that the dimethylol propionic acid employed in that example was replaced with additional trimethylolethane, was dispersed in an aqueous media containing solvent after having been neutralized as described in Example 2. Dispersions, although initially clear, became cloudy within several weeks and within two months had separated into two layers, indicating instability of the resin.

Example 3

An epoxy modified alkyd resin having the following composition was prepared with the equipment and procedure described in Example 1.

| Ingredient | Weight in pounds |
|---|---|
| Epoxy resin | 87 |
| Tall oil fatty acids | 323 |
| Safflower fatty acids | 57 |
| Trimethylolethane | 177 |
| Dimethylol propionic acid | 92 |
| Phthalic anhydride | 279 |

The epoxy resin with an epoxide equivalent of from 450 to 525 ("Epon Resin 1001") and the tall oil and safflower fatty acids were charged to the flask while a carbon dioxide blanket was maintained above the mixture. The flask was heated to a temperature of 230° C. until the reaction contents of the flask had an acid value of 100, after which the flask was cooled to 175° C. Thereafter the dimethylol propionic acid, the trimethylolethane and the phthalic anhydride were added while heating and agitation were continued and the temperature was raised to 230° C. The reaction was continued until the contents of the flask had an acid value of 55. Thereafter heating was discontinued and the contents of the flask cooled to 220° C. and this temperature maintained until the contents of the reaction flask had an acid value of 40±2. The contents of the reaction flask were then cooled to 120° C. Thereafter the contents were removed from the reaction flask and dissolved in 412 pounds of n-propoxy propanol to provide a transparent dispersion containing 70% by weight of resin and 30% by weight of solvent.

Example 4

An epoxy modified alkyd resin having the following composition was prepared with the equipment and procedure described in Example 1:

| Ingredient | Weight in grams |
| --- | --- |
| Epoxy resin | 3200 |
| Linseed fatty acids | 4700 |
| Trimethylolethane | 2550 |
| Glyceric acid | 1000 |
| Phthalic anhydride | 4550 |

The epoxy resin having an epoxide equivalent of from 225 to 290 (Epon Resin 834) and the linseed oil fatty acids were charged into the reaction vessel, the flask heated to 210° C. and held to this temperature until an acid value of 78 was obtained. At this point the trimethylolethane and glyceric acid were added and the temperature was again brought up to 220° C. over a 50-minute period at which time the phthalic acid was added. The temperature was again raised to 220° C. and held there until the modified alkyd resin formed had an acid value of 56. The resin was removed from the flask, allowed to cool to 95° C., after which 161 grams of dimethyl amino ethanol were added with agitation directly to the resin. The resin was dispersed in 1500 grams of butyl Cellosolve and 75 grams of gaseous ammonia was bubbled through the resultant dispersion. The resultant product was a clear dispersion of a neutralized epoxy modified alkyd resin and could be further dispersed in water.

Example 5

An epoxy modified alkyd resin having the following composition was prepared with the equipment and procedure described in Example 1:

| Ingredient | Weight in grams |
| --- | --- |
| Epoxy resin | 1600 |
| Linseed fatty acids | 1160 |
| Tung oil fatty acids | 1300 |
| Trimethylolethane | 2000 |
| Glyoxylic acid | 2000 |
| Phthalic anhydride | 5150 |

The epoxy resin (Epon Resin 1001) linseed fatty acids and tung oil acids were charged to the reactor and heated at a temperature of 208° C. until the contents of the vessel had an acid value of 89. The contents of the vessel were then cooled to 185° C. and trimethylolethane and the glyoxylic acid added to the reaction vessel with agitation. The contents of the vessel were reheated to 220° C. and the reaction was carried out while agitation was continued for a period of one hour. After again cooling the contents of the vessel to 185° C. the phthalic anhydride was added with agitation and the mixture was agitated at a temperature of between 220 and 222° C. until the contents of the vessel had an acid value of 57. The alkyd resin obtained was then removed from the flask and cooled to 85° C. at which time there was added 6000 grams of butyl Cellosolve (butoxy ethanol) and 200 grams of triethyl amine were added with stirring. To the resulting dispersion was added 150 grams of a 28% solution of $NH_4OH$.

Example 6

An epoxy modified alkyld resin having the following composition was prepared with the equipment and procedure described in Example 1:

| Ingredient | Weight in grams |
| --- | --- |
| Epoxy resin | 1600 |
| Linseed fatty acids | 5250 |
| Glycerine | 2000 |
| Phthalic anhydride | 5150 |
| Dimethylol propionic acid | 1060 |

The epoxy resin (Epon Resin 1001) and linseed fatty acids were charged to the reactor under atmosphere of carbon dioxide and heated to 220° C. while stirring. The heating was continued until an acid value of 85 was obtained. At this point glycerine and dimethylol propionic acid were added and the temperature of the reaction mixture dropped to about 180° C. Heating was resumed and the temperature of the contents of the reaction vessel rose over a 30 minute period to 200° C. after which phthalic anhydride was added also with agitation. The temperature of the contents of the reaction vessel was then raised to 220° C. and held until an epoxy modified alkyd resin having an acid value of 58 was formed. The resin was removed from the reaction flask and cooled to 90° C. At this time 6000 grams of n-propoxy propanol were added to the mixture to form a transparent, brilliant, clear dispersion of the resin in the n-propoxy propanol. To the resulting dispersion was added 100 grams of aqueous solution containing 20% by weight of potassium hydroxide to provide a dispersion containing water, n-propoxy propanol and partially neutralized alkyd resin. Dispersion had a pH of 6.1. To this dispersion there was added a 28% by weight aqueous solution of $NH_4OH$ in an amount sufficient to provide a dispersion having a pH of 8.5. The final dispersion could be dispersed in water in any proportion to provide a stable, clear, film forming composition, to which could be added other conventional paint ingredients, pigments, inorganic fillers, extenders, tints and the like.

When the epoxy resin is omitted from the formulations set forth in the foregoing Examples 1 through 6 and such formulations are dispersed in organic solvents or water organic solvent mixtures, such dispersions or solutions often cloud or become turbid after short periods of time when stored under accelerated aging conditions at about 140° F. and ultimately if storage is continued the clouding becomes more intense and the dispersion separates into two layers.

Formulations in which the epoxy resin is omitted, when incorporated into film forming compositions immediately after their preparation produce films which have a low water and alkali resistance when compared to films formed by products which contain epoxy resins.

Formulations in which the hydroxyl substituted aliphatic acid is omitted and such acid replaced by polyhydric alcohol exhibited substantially the same instability as formulations in which the epoxy resins have been omitted. Moreover films formed from resinous products in which the hydroxyl substituted aliphatic acid are omitted are not as water resistant as films formed from the resin formulations listed in Examples 1 through 6.

Formulations, in which all of the neutralization is accomplished (to pH of 7.5–8.5) with an alkaline compound of low vapor pressure, such as an alkali metal hydroxide or aliphatic amine, exhibit good water solubility but films formed therefrom have poor water and alkali resistance.

Likewise films formed from formulations neutralized entirely by ammonia, although water resistant, yellow badly on aging.

What is claimed is:

1. An epoxy-modified alkyd resin comprising the reaction product obtained by reacting
   (A) from about 1% to about 25% by weight, based on the weight of the reaction product, of a glycidyl polyether of a dihydric phenol, and
   (B) from about 5% to about 60% by weight, based on the weight of the reaction product, of a monocarboxylic fatty acid, thereby forming a reaction mixture comprising a partial ester of said polyether and said monocarboxylic fatty acid; reacting said reaction mixture with
   (C) from about 50 percent to about 10 percent by weight of the reaction product of a polycarboxylic acid, and
   (D) from about 0.5 to about 1.5 mols per mol of carboxylic acid of a polyhydric alcohol, and
   (E) a hydroxyl substituted aliphatic acid selected from the group consisting of glyoxylic acid, glyceric acid, dimethylol propionic acid and mixtures thereof, thereby forming a hydroxyl substituted acid containing reaction product; reacting said hydroxyl substituted acid-containing product with
   (F) from about 1.0 to about 2.0 parts of an alkaline compound having a low vapor pressure and selected from the group consisting of an alkali metal hydroxide and an aliphatic amine, per 100 parts of said reaction product, thereby forming a partially neutralized product; reacting the partially neutralized product with
   (G) from about 0.6 to about 0.8 parts per 100 parts of said last mentioned product, of ammonia.

2. A resin as in claim 1 wherein the alkaline compound is an alkali metal hydroxide.

3. A resin as in claim 2 wherein the hydroxyl substituted aliphatic acid is dimethylol propionic acid and the alkali metal hydroxide is potassium hydroxide.

4. A process for preparing an epoxy-modified alkyd resin which comprises reacting
   (A) a glycidyl polyether of a dihydric phenol, and
   (B) a monocarboxylic fatty acid at a temperature in the range of from about 165° C. to about 200° C., thereby forming a reaction mixture having an acid value of from about 90 to about 110 and comprising a partial ester of said polyether and said fatty acid; reacting said reaction mixture with
   (C) a polycarboxylic acid,
   (D) a polyhydric alcohol, and
   (E) a hydroxyl substituted aliphatic acid selected from the group consisting of glyoxylic acid, glyceric acid, dimethylol propionic acid and mixtures thereof at a temperature in the range of from about 150° C. to about 240° C., for a time sufficient to form an epoxy-modified alkyd resin having an acid value of between 20 and about 90; reacting with the reaction product so formed at a temperature in the range of between about 70° C. and about 100° C., with from about 1 to about 2 parts, per 100 parts of said reaction product, of an alkaline compound selected from the group consisting of an alkali metal hydroxide, an aliphatic amine, and mixtures thereof, thereby forming a partially neutralized product; adding to said partially neutralized product from about 0.6 to about 0.8 parts, per 100 parts of last said mentioned product, of ammonia.

5. A process for preparing an epoxy-modified alkyl resin which comprises reacting
   (A) a glycidyl polyether of a dihydric phenol, and
   (B) a monocarboxylic fatty acid at a temperature in the range of from about 165° C. to about 200° C., thereby forming a reaction mixture having an acid value of from about 90 to about 110 and comprising a partial ester of said polyether and said fatty acid; reacting said reaction mixture with
   (C) a polycarboxylic acid, and
   (D) a polyhydric alcohol, and
   (E) a hydroxyl substituted aliphatic acid selected from the group consisting of glyoxylic acid, glyceric acid, dimethylol propionic acid and mixtures thereof at a temperature in the range of from about 150° C. to about 240° C. for a time sufficient to form an epoxy-modified alkyl resin having an acid value of between about 30 and about 50; dispersing the reaction product so formed in a water soluble, lower alkoxy lower alkanol to form a dispersion comprising said modified alkyl resin dispersed in said lower alkoxy, lower alkanol; adding to the dispersion an amount sufficient to provide a pH in said dispersion of between about 6 and about 7, of an aqueous solution of an alkali metal hydroxide and an aliphatic amine, thereby forming a partially neturalized dispersion; and thereafter adding to the dispersion containing said alkaline compound an amount sufficient to raise the dispersion to between 7.5 and 8.5 of an aqueous solution of ammonium hydroxide.

6. A process as in claim 5 wherein the lower alkoxy alkanol is n-propoxy propanol, the aqueous solution of an alkaline compound is an aqueous solution containing from about 15% to about 25% by weight of potassium hydroxide and the aqueous solution of ammonium hydroxide contains from between about 25% to about 30% by weight of $NH_4OH$.

References Cited
UNITED STATES PATENTS

| | | | |
|---|---|---|---|
| 2,887,459 | 5/1959 | Carmody | 260—22 |
| 3,027,341 | 4/1962 | Boucher et al. | 260—22 |
| 3,040,000 | 6/1962 | Stephens et al. | 260—77 |
| 3,047,524 | 7/1962 | Bowman | 260—33.2 |
| 3,312,736 | 4/1967 | Ruhf | 260—75 |

DONALD E. CZAJA, *Primary Examiner.*

R. W. GRIFFIN, *Assistant Examiner.*

U.S. Cl. X.R.

260—29.2, 32.4, 32.6, 33.2; 117—167